US012603508B2

(12) United States Patent
Thompson et al.

(10) Patent No.: US 12,603,508 B2
(45) Date of Patent: Apr. 14, 2026

(54) RESERVE DISPATCH POWER MANAGEMENT

(71) Applicant: Solaredge Technologies Ltd., Herzeliya (IL)

(72) Inventors: Christopher Thompson, Provo, UT (US); Gad Michaeli, Kochav Yair (IL); Ohad Portnoy, Herzliya (IL); Yakir Loewenstern, Ariel (IL)

(73) Assignee: Solaredge Technologies Ltd., Herzeliya (IL)

( * ) Notice: Subject to any disclaimer, the term of this patent is extended or adjusted under 35 U.S.C. 154(b) by 354 days.

(21) Appl. No.: 18/192,015

(22) Filed: Mar. 29, 2023

(65) Prior Publication Data

US 2023/0318307 A1 Oct. 5, 2023

Related U.S. Application Data

(60) Provisional application No. 63/325,125, filed on Mar. 29, 2022.

(51) Int. Cl.
*H02J 3/38* (2006.01)
*G05B 19/042* (2006.01)
(Continued)

(52) U.S. Cl.
CPC ............ *H02J 3/381* (2013.01); *G05B 19/042* (2013.01); *H02J 3/004* (2020.01); *H02J 3/32* (2013.01);
(Continued)

(58) Field of Classification Search
CPC . G05B 19/042; G05B 2219/2639; H02J 1/08; H02J 1/102; H02J 13/00002;
(Continued)

(56) References Cited

U.S. PATENT DOCUMENTS

2013/0131884 A1* 5/2013 Jain ........................... H02J 3/46
                                                700/297
2015/0267683 A1* 9/2015 Ubben ...................... F03D 7/00
                                                290/44
(Continued)

FOREIGN PATENT DOCUMENTS

AU       2018269183 A1    1/2020
EP         2595267 A2    5/2013

OTHER PUBLICATIONS

Aug. 3, 2023—EP Search Report—EP App. No. 23165174.6.

*Primary Examiner* — Chun Cao
(74) *Attorney, Agent, or Firm* — Banner & Witcoff, Ltd.

(57) ABSTRACT

A power system may comprise a plurality of power sources, each connected to a corresponding power device. The power devices may be connected in series or in parallel. Each power device may comprise input terminals connected to the corresponding power source, output terminals, and a power circuit (e.g., a power converter) that may be configured to convert input power from the corresponding power source to output power. The power regulator may further comprise a regulator communications module that may be configured to receive a power regulation indication relating to regulating an operational characteristic of the power regulator. The regulator controller may be configured to instruct the power converter to increase or decrease the regulator operational characteristic based on the power regulation indication, and based on power production characteristics of the power regulator. The change the operational characteristics may be used to estimate reserved power of the system.

20 Claims, 10 Drawing Sheets

(51) Int. Cl.
*H02J 3/00* (2006.01)
*H02J 3/32* (2006.01)

(52) U.S. Cl.
CPC ... *G05B 2219/2639* (2013.01); *H02J 2300/26* (2020.01)

(58) Field of Classification Search
CPC .... H02J 2300/24; H02J 2300/26; H02J 3/004; H02J 3/32; H02J 3/381; H02J 7/00712
USPC ......................................................... 700/295
See application file for complete search history.

(56) References Cited

U.S. PATENT DOCUMENTS

2016/0241042  A1      8/2016  Mammoli et al.
2017/0358929  A1 *  12/2017  Koeppe ..................... H02J 1/08
2018/0019594  A1      1/2018  Min
2020/0014212  A1      1/2020  Mousavi
2024/0097486  A1 *    3/2024  Panni ...................... H02J 3/004

* cited by examiner

300

COLLECT HISTORICAL POWER PRODUCTION DATA FROM A PLURALITY OF POWER DEVICES

601

CALCULATE A THEORETICAL ESTIMATED TOTAL POWER CAPACITY PER POWER DEVICE REFERENCE

603

COMPARE THEORETICAL ESTIMATED TOTAL POWER CAPACITY TO ACTUAL TOTAL POWER

605

SELECT A POWER DEVICE FOR MAXMUM OUTPUT POWER MODE BASED ON MINIMIZED ERROR

607

500

RESERVE DISPATCH POWER MANAGEMENT

CROSS-REFERENCE TO RELATED APPLICATIONS

This application claims the benefit of U.S. Provisional Application No. 63/325,125, filed on Mar. 29, 2022. The entire disclosure of the foregoing application is incorporated by reference in its entirety.

BACKGROUND

The present disclosure relates to renewable power systems. More specifically, renewable power systems, such as photovoltaic systems, may operate at varying capacities that range, for a given set of conditions, from outputting the maximum amount of power the system is able to generate to outputting no power. In such systems, the amount of reserve power the renewable power system maintains and is capable of dispatching at a given time when the renewable power system is operating at less than maximum capacity may be unknown and difficult to determine.

SUMMARY

The following presents a simplified summary of various concepts disclosed herein. This summary is not an extensive overview and is not intended to identify key or critical elements or to delineate the scope of the claims. This summary is not intended to limit or constrain the present disclosure.

Systems, methods, and apparatus are described that retain a portion of power generatable by a power system for future dispatch and accurately estimate the portion of the retained power available at a given moment.

The systems and apparatus may include, and the methods may relate to, renewable power sources coupled to power devices configured to selectively operate in first and second modes of operation. In the first mode of operation, the maximum available power (or substantially the maximum available power) from the renewable power sources that the power devices are capable of outputting is provided at the outputs of the power devices. The maximum available power may include the power from the power sources operated at a maximum power point, less any power reduction due to errors or limited capabilities in the power devices in tracking the maximum power point, or due to inefficiencies in the power converter converting the power, or due to a predetermined (safety) margin. In the second mode of operation, the power may be deliberately curtailed to a value less than the aforementioned maximum power point. For example, the curtailed output may be zero or a relatively low output value. Accordingly, (substantially) less than the maximum available power may be provided at the outputs of the power devices. For example, less than maximum available power may be provided at the outputs of the power devices by decreasing the power drawn to less than maximum available power at the power device inputs, and/or by transferring some input power to an energy storage device, and/or by increasing losses incurred by the power sources or power devices. The power devices may be, based on receiving a signal, configured to change from the first mode of operation to the second mode of operation (e.g., temperature derating, limited output power) and vice versa (e.g., to increase the output power in response to a dispatch need).

The systems and apparatus may include, and the methods may relate to, one or more power devices (e.g. power converters, or other power circuits enabling selective provision of power) operating in the first mode of operation (substantially maximum power output) to provide a reference for potentially available power drawn from a single renewable power source, and a control device using the reference for extrapolation and estimation of total available power in the power system. Information indicating an estimated value of total available power kept in reserve by the power system, as described herein, may be used in various ways. For example, an output signal may be generated based on a determined (estimate) value for reserve power of one or more power devices in the power system. Information may be broadcast or otherwise signaled, e.g. to an electrical grid and/or other systems such as other power production systems, power consumption systems, power storage systems, et cetera. For example, the information may be signaled to the electrical grid and/or other systems on the grid. A grid controller may use information about the reserved power estimate for controlling power production, consumption, storage, distribution, balancing, et cetera. Other systems may use information about the reserved power estimate for controlling their own power production, consumption, and/or storage. For example, when there is a need for additional power, the power system keeping a predetermined estimate of power in reserve, may increase its power production in a predictable way. Conversely, the power system as described herein may receive a signal from the grid (controller) and/or other systems, and adjust the estimated power kept in reserve based on the received signal. For example, the received signal may include an indication of power to be kept in reserve, and a controller of the power system may adjust a selection of power devices outputting maximum power and/or curtailed power such that an estimate value for reserve power matches the received indication of power to be kept in reserve. These and other uses of the present systems and methods may contribute to overall improvement of power production, consumption, storage, distribution, balancing, et cetera.

BRIEF DESCRIPTION OF THE DRAWINGS

Some features are shown by way of example, and not by limitation, in the accompanying drawings. In the drawings, like numerals reference similar elements.

DETAILED DESCRIPTION

In the following description of, reference is made to the accompanying drawings, which form a part hereof, and in which are shown, by way of illustration, various examples of the disclosure. It is to be understood that the examples shown and/or described are non-exclusive, and other examples may be practiced, and structural and functional modifications may be made without departing from the scope of the present disclosure.

The present disclosure includes devices, systems, and methods for retaining power for rapid dispatch and/or slow dispatch and accurately estimating the amount of retained power.

One or more aspects may be embodied in computer-usable data and computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), or the like. Particular data structures may be used to more effectively implement one or more aspects of the disclosure, and such data structures may be within the scope of computer executable instructions and computer-usable data described herein. For example, the controller 405 illustrated in FIG. 4 and the methods illustrated in FIG. 5 may be implemented with a combination of hardware, firmware, and computer implemented instructions as described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Figure 1A:
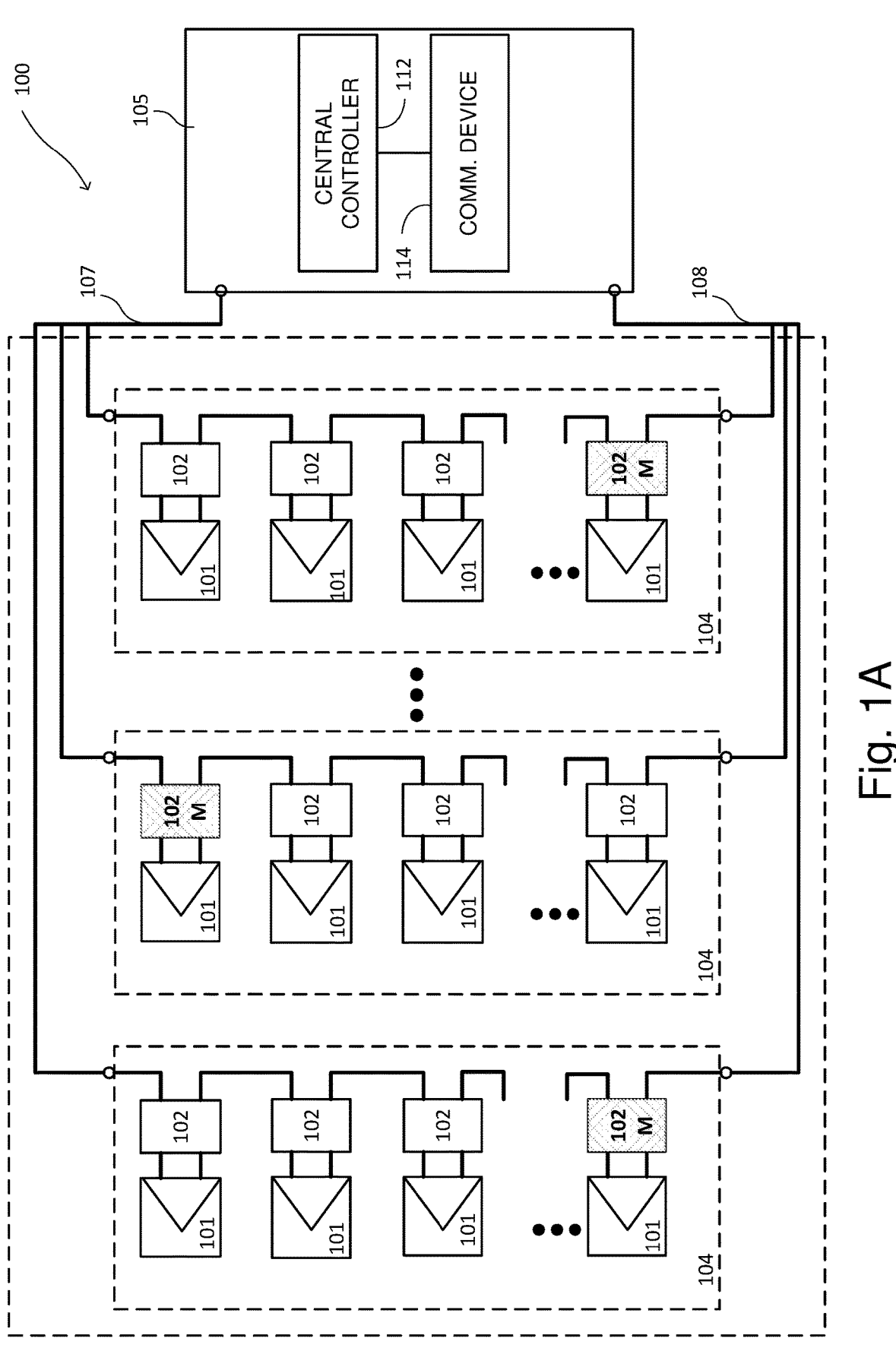
FIGS. 1A and 1B show example power systems.

Reference is now made to FIG. 1A, which illustrates a power system in accordance with one or more aspects of the disclosure herein. Power system 100 may include a plurality of power sources 101. Power sources 101 are illustrated as photovoltaic (PV) generators, but may also include other types of power sources, for example, renewable power sources having non-deterministic maximum power output (e.g., wind turbines, battery cells, to name a few non-limiting examples). Power sources 101 may each comprise one or more PV cells, modules, panels, shingles, roof tiles, building-integrated PV modules, etc. Each power source 101 may be coupled to a respective power device 102. Power device 102 may include input terminals, output terminals, and power electronics configured to control an amount of power provided at the output terminals. For example, power device 102 may include a direct-current to direct-current (DC/DC) converter configured to draw input power from the respective power source according to either of a first mode (e.g., a maximum power point tracking (MDPT) mode) of operation or a second mode (e.g., reduced power point mode) of operation. Further, power device 102 may provide output power that is substantially equal to the input power (minus unavoidable efficiency losses). Additionally, the output power may be substantially equal to the input power to the power device multiplied by an efficiency conversion factor of the power device. Additionally, or alternatively, power device 102 may include a direct-current to alternating-current (DC/AC) converter configured to convert an input DC voltage to an output AC voltage. In some cases, power device 102 does not provide conversion circuitry, but may provide one or more power switches configured to selectively connect the input terminals of the power device to the output terminals of the power device, and/or may provide one or more power switches configured to selectively partially or completely disconnect a power source from the input to power device 102 or from the output of power device 102, and/or may provide one or more power switches configured to selectively partially or completely bypass the input terminals or output terminals of power device 102.

In FIG. 1A, groups of power devices 102 are connected in series at their outputs to form one or more strings 104. Strings 104 are connected between rails (e.g. power conductor lines) 107 and 108. Where power devices 102 provide output DC voltage, rails 107 and 108 are DC rails. Where power devices 102 provide output AC voltage (e.g., via microinverters), rails 107 and 108 are AC rails. Rails 107 and 108 are connected to system management device 105. System management device (SMD) 105 may include communication device 114 and central control device 112. Communication device 114 (e.g., including a modem, data converters, modulators, transceivers, and/or antennas) may be configured to communicate (e.g. via wireless or wired communication) with power devices 102 and/or with one or more upstream computing devices (e.g. server, central computer station, the internet, mobile apps, etc.). SMD 105 may include a DC/AC converter. For example, where rails 107 and 108 are DC rails, a DC/AC converter of SMD 105 may convert input DC power to output at its output terminals AC power provided to a power grid or a load. In some cases, SMD 105 may include a DC/DC converter configured to control DC voltage between rails 107 and 108 (e.g., according to a MPPT algorithm or to provide a regulated or substantially constant voltage between rails 107 and 108). SMD 105 may further include safety device(s), sensor(s), auxiliary power supply and various other components (not explicitly depicted). SMD 105 may be configured to output power based on a power limit. The power limit may be predetermined (e.g., the output power rating of SMD 105, etc.) and/or real-time determined (e.g., temperature derating, limited export to a load or grid, etc.)

One or more power devices 102 may be configured to curtail power production. As described herein, curtailing power output or power production of a power device may comprise limiting output or production of the power device to a (non-zero) value that is less than a percentage of a maximum power output of the power device. For example the percentage may be 95%, 90%, 50%, 25%, 10%, or even 5%. One or more power devices 102 may be configured to maximize power production. As described herein, maximizing power output or power production of a power device may comprise removing limitation of output or production of the power device to a value that is at or close to a maximum power output of the power device. For example the value may more than 95% or the maximum power output, more than 99% of the maximum power output, or even 100% of the maximum power output. In some cases, the power curtailment may be in order to reserve (e.g., retain) power for (e.g., rapid and/or slow) dispatch (e.g., switching to maximum power in response to a command). In some cases, specific power devices may be selected (e.g., preselected) and programmed and/or configured for power curtailment. In some cases, all power devices 102 may be programmed and/or configured to have power curtailment capabilities, and certain power devices 102 are selected to implement curtailment when desired.

One or more power devices 102 may be configured to maximize output power to provide a power reference signal used to estimate of curtailed or reserved power. In some cases, specific power devices may be selected (e.g., preselected) and programmed and/or configured for output power maximization. In some cases, all power devices 102 may be programmed and/or configured to have power maximization capabilities, and certain power devices 102 are selected to implement maximization when desired.

Still referring to FIG. 1A, in one example, each string 104 features a single power device 102M (shown with a patterned fill) configured to operate to maximize output power, while all the other power devices 102 (without patterned fill) are configured to operate curtail output power. In another example, one or more strings 104 may feature a plurality of power devices as power device 102M. Power devices 102 may be identical to power devices 102M but are operating in a different mode of operation. SMD 105 may be configured to (via communication device 114) send a message to one or more power devices 102 instructing the power device 102 to operate in a power maximizing mode (i.e. to operate as 102M) or to operate in a power curtailment mode. Power devices 102 and 102M may each include a communication device (e.g., communication 404, discussed below with reference to FIG. 4) similar to communication device 114. For example, SMD 105 may be configured to signal a power device in a power curtailment mode to increase the output power in response to a dispatch need.

As a numerical example, power system 100 may comprise 30 power sources 101, each coupled to a power device 102/102M. The power sources and power devices may be divided into three strings 104, and each string 104 includes a single power device 102M configured to maximize output power while other power devices 102 are configured to curtail output power. In this example, at a first point in time, each power source 101 may be capable of producing a maximum power of 250 W. Power devices 102 may each be configured (e.g., instructed by SMD 105) to output a maximum of 200 W, and since more than 200 W are available, each curtailing power device 102 may succeed in outputting 200 W. Power devices 102M may operate to maximize output power and output substantially 250 W (ignoring minor, unavoidable losses). The total power output by the system will then be 3*250 W+27*200 W=6150 W. Each power device 102/102M may report (e.g. via communication devices) its respective power production to SMD 105. SMD 105 may, based on the reports, estimate that since three power devices 102M are capable of outputting 250 W and correspond to power sources spatially distributed in power system 100, then the total power production capacity of power system 100 at this time is 250 W*30=7500 W, with curtailed power of 50 W*27=1350 W (or total power reserves of %18 for rapid dispatch).

Still referring to the example above, if at a second point in time a single power device 102M operating to maximize output power reports a power production of 230 W, then SMD 105 may estimate that the average maximum power production capacity of each power device 102 is the average of the power produced by the three 102M devices: (250 W+250 W+230 W)/3=243 W. In that case, SMD 105 may estimate that the total system production capacity is 243 W*30=7290 W, total production is 200 W*27+250 W*2+ 230 W=6130 W, with curtailed power of 1160 W (or total power reserves of %16 for rapid dispatch).

If, at a third point in time SMD 105 instructs the three 102M power devices to cease maximizing power and to enter a power curtailment mode of operation, and instructs three other power devices 102 to enter a maximum output power mode of operation (e.g., to improve spatial resolution of power production estimates, and/or to receive maximum power production information for additional power devices), the three other power devices 102 may, for example, produce 245 W, 250 W and 215 W, respectively. If the third point in time is sufficiently close to the second point in time, then the SMD may calculate a second average based on the three "old" 102M power devices and the three "new" 102M power devices: (250+250+230+245+250+215)/6=240 W. In this case, SMD 105 may estimate that the total system production capacity is 240 W*30=7200 W, total production is 200 W*24+250 W*2+230 W+245 W+250 W+215 W=6240 W, with curtailed power of 960 W (or total power reserves of %13 for rapid dispatch). In cases where the second and third points in time are not close together (e.g. differ by many minutes or hours) the SMD may calculate a weighted average that provides increased weight to more recent measurements, or may discard "old" measurement and rely only on "new" measurements.

SMD 105 may utilize historical measurement (e.g., measurements taken at particular time instances in the past) to further improve estimates of curtailed power. For example, if historical measurements indicate two power devices 102 tend to exhibit correlative power production, and at a point in time one of the two devices is operating in curtailed power mode while the other is operating in maximum power output mode, SMD 105 may use this correlation to estimate a power production capability of the curtailed device. As another example, if a specific power device 102 exhibits substantially periodic behavior (e.g., power production at 12:00 noon tends to be similar from one day to the next), SMD 105 may use historical data related to maximum-output-power-mode production of a power device 102 to estimate a curtailed power of the power device 102 at time when the power device 102 is operating in curtailed output power mode.

SMD 105 may also utilize other types of measurements (e.g. irradiance, wind speed, temperature and other parameters measures by various sensors distributed in the power system) to improve estimation accuracy, for example, by correlating maximum power output of a power device 102 to these measurement.

In some cases, a rated maximum power output of one or more power devices 102 may be lower than power available from a corresponding power source 101. For example, a power source capable of producing up to 400 W may be coupled to a power device limited to processing and/or outputting 300 W. In this case, a power converter 102M operating in maximum output power mode may output up to its maximum rated power (in this example, 300 W) and not up to the maximum power of the corresponding power source (in this case, 400 W). In some examples, where maximum output rated power is lower than actual available input power, MPPT is not used even when power device 102 is providing its maximum output (e.g., rated) power.

In some cases, power system 100 may comprise a storage device (not shown in the figure). SMD 105 may be coupled to the storage device. If system management device 105 is operated in the output power curtailment mode, instead of drawing less than maximum power available at the input (and in a sense "wasting" unused input power), SMD 105 may store energy (e.g., but charging a battery) in the storage device. The power transferred to storage device may still be useful and reserve (e.g., retain) power for dispatch, since it may be rapidly (e.g., in response to a command from communication device 114) diverted to the output terminals. In some cases, the energy storage device may provide additional dispatchable power.

Figure 1B:
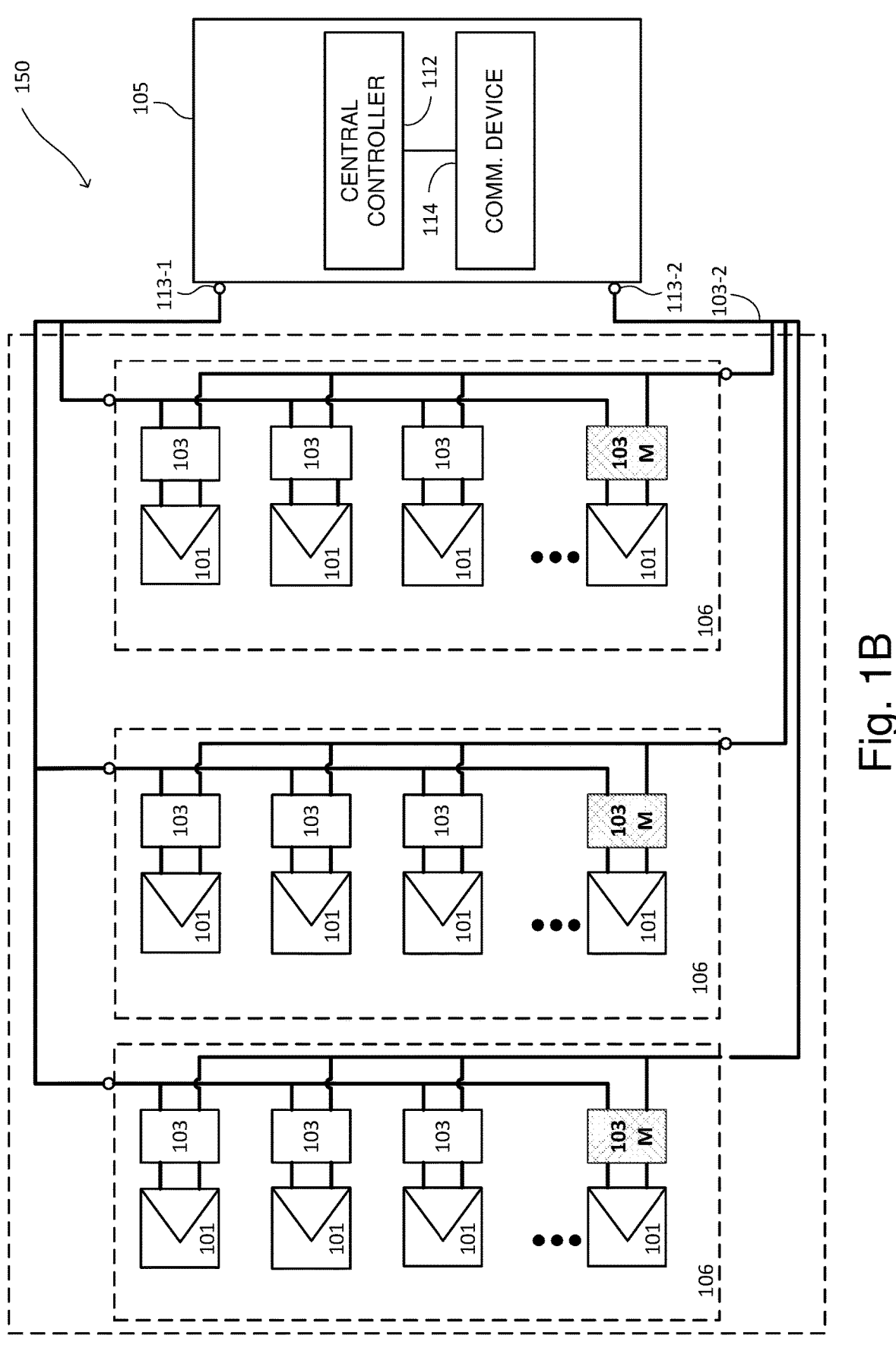

Reference is now made to FIG. 1B, which shows a power system 150 according to aspects of the disclosure herein. In power system 150, power devices 102/102M are replaced by power devices 103/103M. Power devices 103/103M may include input terminals, output terminals, and power electronics configured to control an amount of power provided at the output terminals. For example, power devices 103/103M may include a direct-current to direct-current (DC/DC) converter configured to draw input power from the respective power source according to at least one of an MPPT mode of operation and a reduced power point mode of operation, and to provide output power that is substantially equal to the input power (minus unavoidable efficiency losses). The output power may be substantially equal to the input power to the power device multiplied by an efficiency conversion factor of the power device. Additionally or alternatively, power device 103/103M may include a direct-current to alternating-current (DC/AC) converter configured to convert an input DC voltage to an output AC voltage. In some cases, power device 103/103M does not provide conversion circuitry, but may provide one or more power switches configured to selectively connect the input terminals of the power device to the output terminals of the power device, and/or may provide one or more power switches configured to selectively partially or completely disconnect a power source from the input to power device 102, and/or may provide one or more power switch configured to selectively partially or completely bypass the input terminals of power device 103/103M.

Power system 150 may comprise strings 106. Each string 106 may comprise one or more power devices 103/103M connected in parallel at their outputs. If power devices 103/103M include DC/DC converters, the DC/DC converters may be configured to boost an input voltage to an output DC voltage common to all of the parallel-connected power devices 103/103M, or, if the input voltages to each power device is large, the DC/DC converters may be configured to reduce an input voltage to an output DC voltage common to all of the parallel-connected power devices 103/103M. If power devices 103/103M include a DC/AC converter (e.g., a microinverter), each DC/AC power converter may output an AC voltage synchronized and of substantially equal magnitude to the output AC voltage of all the other parallel-connected power devices 103/103M. If power devices 103/103M include 3-phase DC/AC converters, each power device may provide three output power lines (in FIG. 1B, only two are depicted) to enable parallel connection of each of the three phases.

A cable trunk may be provided to enable rapid parallel connection of output terminals of power devices 103/103M. The cable trunk may also be designed to enable effective wired communications (e.g. power line communications between the communication devices in 102 and 105).

System management device (SMD) 105 may be similar to or the same as SMD 105 of FIG. 1A, and may provide similar functionality. SMD 105 may be electrically and/or communicatively coupled to power devices 103/103M. If power devices 103/103M are configured to output DC voltage, SMD 105 may include a DC/AC converter configured to provide an AC voltage and power to an AC power grid. If power devices 103/103M are configured to output AC voltage, SMD 105 may include sensors for monitoring AC power provided to an AC grid, and/or SMD 105 may not be electrically coupled to power devices 103/103M, with the output terminals of each power device 103/103M directly coupled (or coupled via safety devices and/or switches not part of SMD 105) to an AC grid.

Power devices 103/103M may provide power curtailment and reserve dispatch similarly to disclosed with respect to power devices 102/102M, and SMD 105 may interact with power devices 103/103M similarly to as described above with respect to power devices 102/102M. In FIG. 1B three power devices 103 are indicated (by the 'M' suffix and a patterned fill) as operating in maximum output power mode. Similarly to above, more or less power devices may be operating in maximum output power mode, the spatial distribution of power devices be operating in maximum output power mode may be different and/or may change over time (e.g., SMD may signal power devices to shift between maximum output power mode and output power curtailment mode).

Figure 2A:
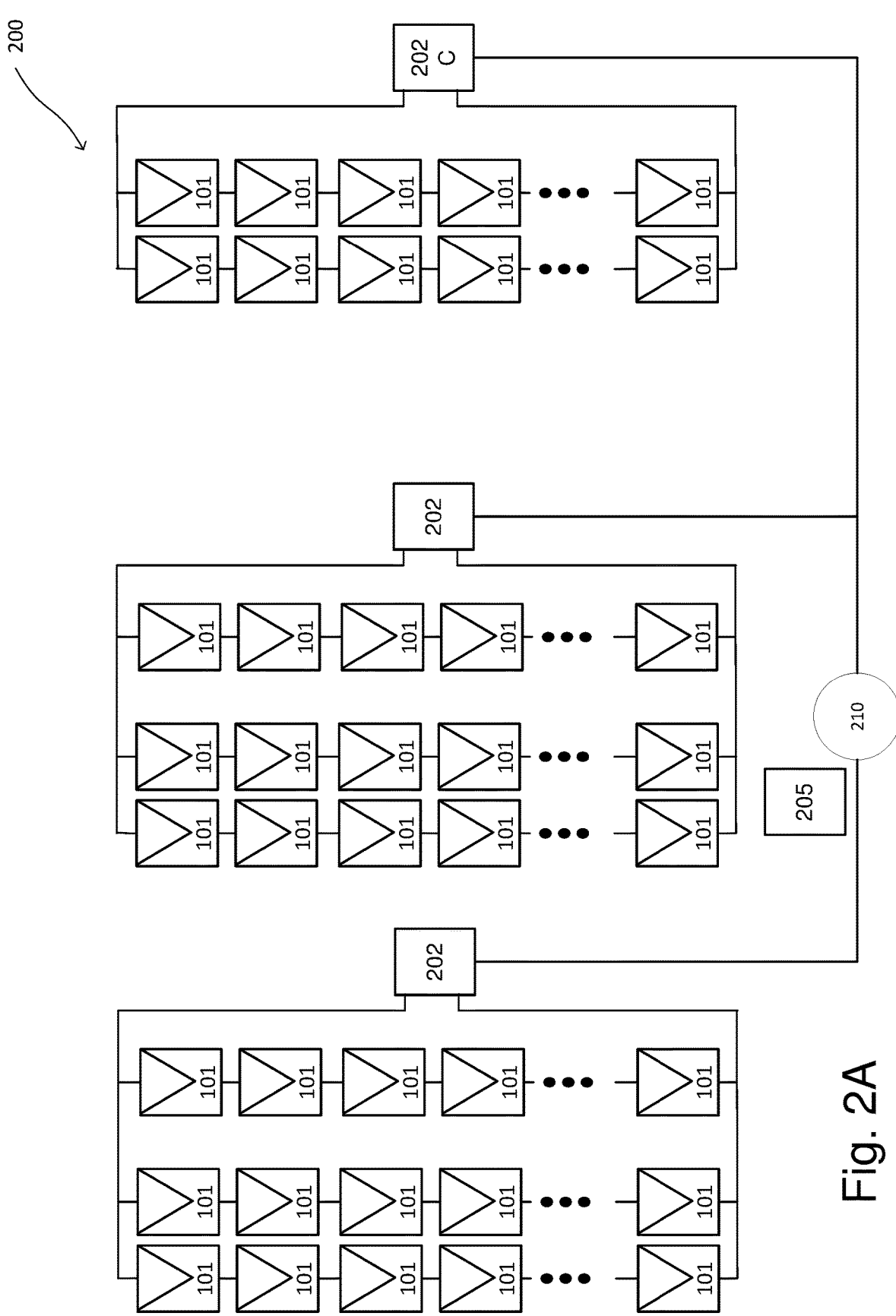
FIGS. 2A, 2B, 2C, and 2D show example power systems.

Reference is now made to FIG. 2A, which illustrates a power system 200 (e.g., a photovoltaic power system) according to aspects of the disclosure herein. Power system 200 may comprise one or more inverters 202. Each inverter 202 may be coupled to a large number of power sources 101 (for example, photovoltaic generators) without intermediate power devices coupled to individual power sources. In this case, each inverter 202 may be configured to operate in a maximum output power mode in which the inverter 202 outputs maximum power available from the power sources 101 coupled at the inverter input, or to operate in a power curtailment mode. Each inverter 202 may be connected to power grid 210 (for ease, a single-line connection is illustrated, though generally inverters coupled to large power sources tend to be 3-phase inverters having three output power lines). System Management Device (SMD) 205 may be communicatively coupled to inverters 202 (e.g., via communication devices 114 in the respective devices and inverters) and may instruct them to selectively operate in power curtailment mode or in maximum power production mode, may receive power production measurements from inverters 202 and may use the power production measurements to estimate total power system capacity and curtailed power.

In some cases, different inverters 202 may be coupled to power sources of different maximum power values. For example, inverter 202C may be coupled to power sources having a total maximum power production capacity of 200 kW, while two inverters 202 are coupled to power sources having a total maximum power production capacity of 300 kW. In this case, according to one example, if inverter 202C is operating in a maximum output power mode and outputting 150 kW (or %75 of its rated output capacity), while two inverters 202 are each outputting 200 kW (e.g., responsive to a limit communicated by SMD 205), then the SMD may estimate that the two inverters are capable of producing 0.75*300 kW=225 kW, and that total curtailed power reserved for dispatch is 25 kW*2=50 kW, and total power reserves of 50 kW/(2*225 kW+150 kW)=%8.33 for rapid dispatch (e.g. switching to maximum power mode). Where historical data is available, the historical data (e.g. temporal and/or spatial correlations between power production inverters 202 and 202C) may be used to refine an estimate. As described above, SMD 205 may instruct one or more inverters 202/202C to change from a power curtailment mode of operation to a maximum output power mode of operation, or vice-versa.

Figure 2B:
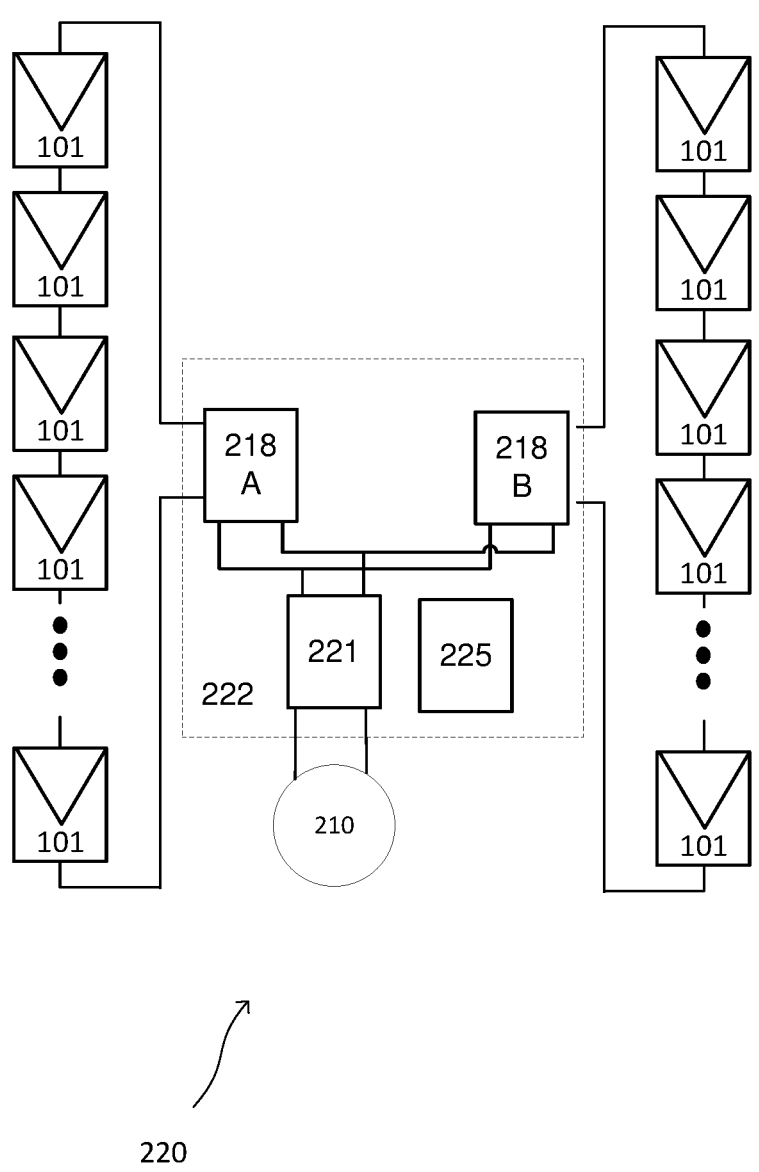

Reference is now made to FIG. 2B, which illustrates a power system 220 according to aspects of the disclosure herein. In this illustrative system, an inverter 222 is coupled to an AC power grid 210. Inverter 222 may comprise two DC/DC converters 218A and 218B and a DC/AC converter 221. DC/DC converters 218A and 218B may each feature a pair of input terminals coupled to a respective string of power sources 101. For example, power sources 101 may include serially connected. DC/DC converters 218A and 218B may each be configured to apply a MPPT method to increase a power drawn at the converter input terminals. Output terminals of DC/DC converters 218A and 218B may be connected in parallel or serial and to input terminals of DC/AC converter 221. DC/AC converter 221 may combine power received from DC/DC converters 218A and 218B and may convert input DC voltage to an output AC voltage provided to power grid 210.

Inverter 222 may include a controller 225 configured to control a mode of operation of DC/DC converters 218A and 218B and/or to control DC/AC converter 221. Controller 225 may be coupled to a communication device (e.g., communication device 114 not explicitly shown) configured to communicate with external devices (e.g., other inverters 222 and/or higher-level system control devices). Controller 225 may selectively operate each of DC/DC converters 218A and 218B to operate in a maximum power output mode or in a power curtailment mode. At a first time, controller 225 may operate DC/DC converter 218A to draw maximum power available at converter inputs, and to output substantially all of the power as maximum output power; and may operate DC/DC converter 218B to limit output power in order to reserve power for (e.g., rapid and/or slow) dispatch. Controller 225 may receive (e.g., via sensors coupled to the outputs of DC/DC converters 218A and 218B) indications of the power production of each of the DC/DC converters and may estimate a total potential output power based on the indications. For example, if each DC/DC converter is couple to power sources having equal power production capabilities (e.g., each is coupled to PV generators capable of producing up to 2 kW), DC/DC converter 218A is outputting 1.8 kW and DC/DC converter 218B is outputting 1 kW, controller 225 may estimate that DC/DC converter 218B is curtailing 800 W of power and that 800 W/(2*1.8 kW)=%22 of total power is being held in reserve.

Controller 225 may control DC/DC power devices 218A and 218B to implement a smooth and gradual transition between maximum-power-output mode and power-curtailment mode. For example, controller 225 (including, for example, a microprocessor, ASIC, FPGA) may, in steps, increase the power limit of DC/DC converter 218B by, for example, 100 W at a time, and correspondingly instruct converter 218A to reduce power by 100 W concurrently, to maintain the same reserve power. Eventually, DC/DC converter 218B will be operating at its maximum output power point, and DC/DC converter 218A will be curtailed based on the number of reduction steps applied. Once DC/DC converter 218B is operating at its maximum power point, controller 225 may estimate the total power capacity of the power system. This method may also be applied to discrete power devices (e.g. those discussed in FIGS. 1A, 1B and 2A) by use of reliable, high-data-rate communications between a central system controller and the power devices and/or directly between the power devices themselves).

FIG. 2B illustrates an inverter having two independent DC/DC power converters as an example. Other inverters in accordance with the disclosure herein main have additional (e.g. three, four, ten, or even twenty or more) DC/DC converters controlled by a single master inverter. One or more DC/DC converters may be operated in maximum output power mode at any given time, and one or more DC/DC converters may be operated in output power curtailment mode at any given time. Gradual (e.g., periodic, one at a time) shifting between operational modes may be variously realized depending on the level of required curtailment and the number of DC/DC converters.

Figure 2C:
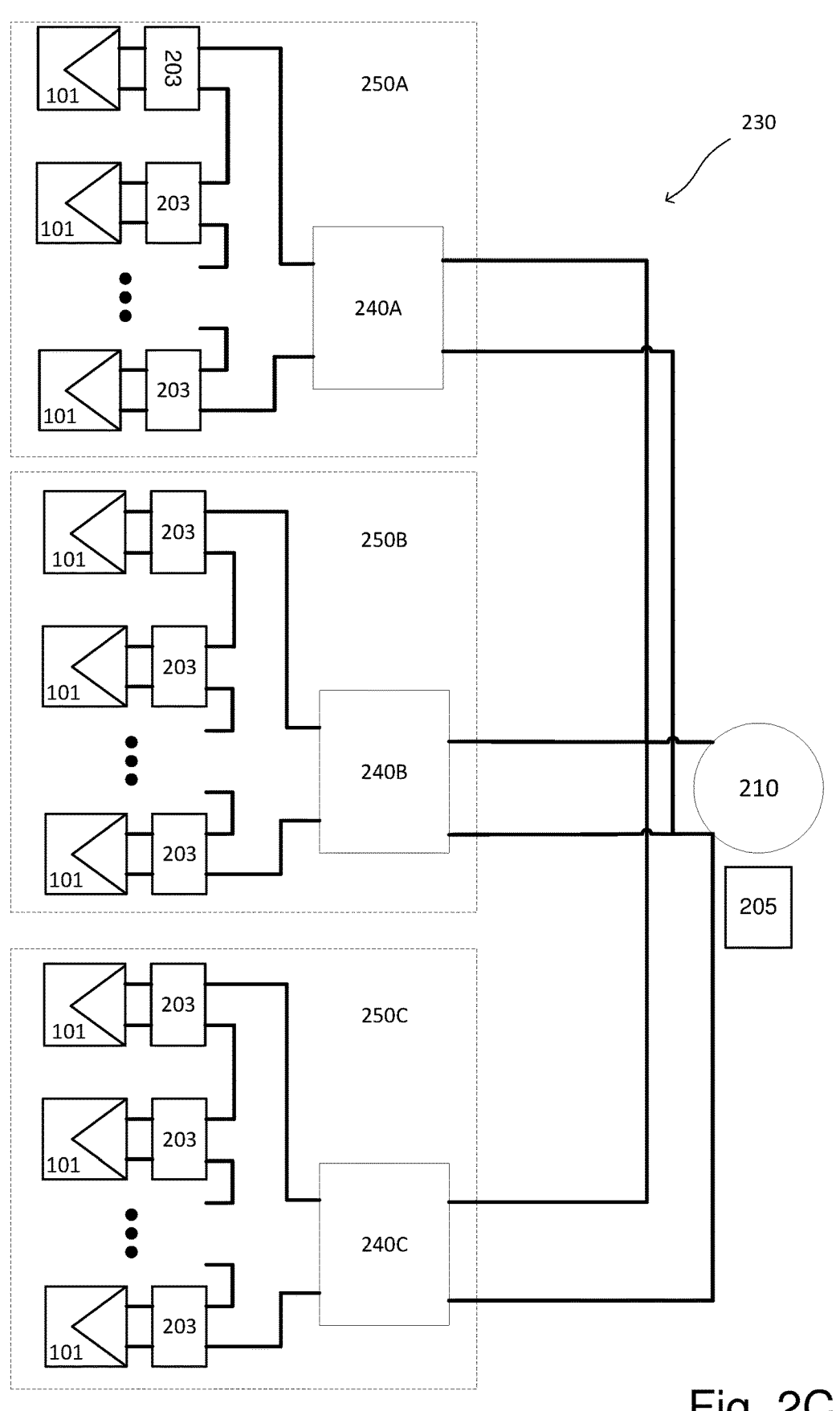

Reference is now made to FIG. 2C, which illustrates a power system 230 in accordance with aspects of the disclosure herein. Power system 230 may comprise one or more inverter production units 250. FIG. 2C illustrates three inverter production units 250A-250C, though more or fewer inverter production units 250 may be present. Each inverter production unit may comprise a plurality of power sources (e.g. photovoltaic generators) 101, each connected to a power device (e.g., a DC/DC power converter) 203. A plurality of DC/DC power converters 203 may be serially (or parallel, or some serial and some parallel) connected, and a series string of DC/DC power converters 203 may be coupled to an inverter 240. Inverter production units 250A-250C may feature inverters 240A-240C, respectively. Inverter production units 250 may be interconnected by connecting output terminals of inverters 240A-240 in parallel and to power grid 210. System management device (SMD) 205 may be configured to communicate with inverters 240 via wires or wireless communications (e.g., via communication devices 214 included in each device).

Power system may enable multiple-granularity power curtailing and reserve power estimation. According to some aspects, power devices 203 may be configured to selectively operate in maximum power output mode and/or in power curtailment mode. According to some aspects, inverters 240 may be configured to selectively operate in maximum power output mode and/or in power curtailment mode. According to some aspects, both inverters 240 and power devices 203 may be configured to selectively operate in maximum power output mode and/or in power curtailment mode, and SMD 205 may be configured to selectively instruct one or more power devices 203 and/or one or more inverters 240 to operate in a maximum output power mode of operation in power curtailment mode. Where a low level of granularity is desired, SMD 205 may instruct one or more power devices 203 (either directly, or by relaying commands via inverters 240) to operate in power curtailment/maximum output power mode, and may instruct inverters 240 to deliver all power provided at their input to power grid 210. When a higher level of granularity is desired (or when power devices 203 are not equipped with the sufficient communication devices or power control logic to enable selective operation in maximum power output/power curtailment modes), one inverters 240 may operate in power curtailment mode. For example, power system 230 may initially be installed without power devices 203 (i.e., power sources 101 may be directly connected to inverters 240). During this initial phase, power inverters 240 may selectively operate in maximum output power/power curtailment modes. If, at a later time, power devices 203 are added to the system, power devices 203 may selectively operate in maximum output power/power curtailment modes while inverters 240 are operated in maximum output power mode.

Figure 2D:
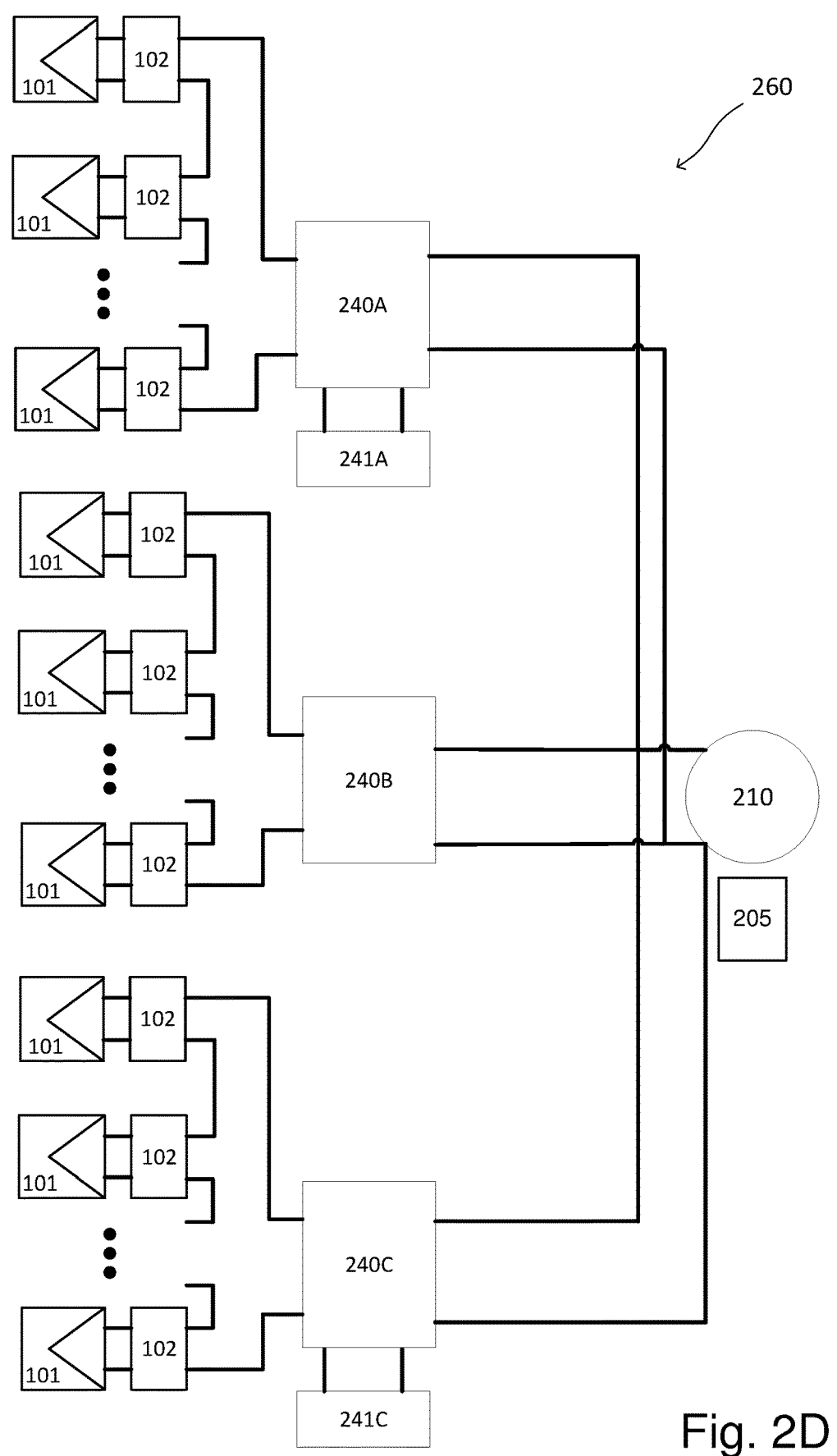

Reference is now made to FIG. 2D, which illustrates a power system 260 in accordance with aspects of the disclosure herein. Power system 260 may be similar to power system 230 of FIG. 2C, with an additional feature of one or more inverters 240 being coupled to a storage device 241. In FIG. 2D, inverters 240A and 240C are coupled to storage devices (e.g. batteries, flywheels, supercapacitors, etc.) 241A, 241C, respectively. If an inverter 240A or 240C is operated in the output power curtailment mode, instead of drawing less than maximum power available at the inverter input (and in a sense "wasting" unused input power), the inverter may store energy (e.g., but charging a battery) in an energy storage device. The power transferred to storage may still be useful and reserve power for dispatch, since it may be rapidly (e.g., in response to a command from 205) diverted to the inverter output. In some cases, the energy storage device may provide additional dispatchable power.

If (for example) inverter 240A is operated in the maximum output power mode, if available power at the inverter input exceeds the output power rating of the inverter (for example, if the power sources 101 connected to an inverter input may produce up to 150 kW of power, but the inverter is only rated to deliver up to 120 kW to the grid), then inverter 240A may charge storage device 241A using the 50 kW of excess input power) and may thereby obtain a more accurate estimate of total available system power (since the actual maximum input power is utilized and thereby sensed).

Figure 3:
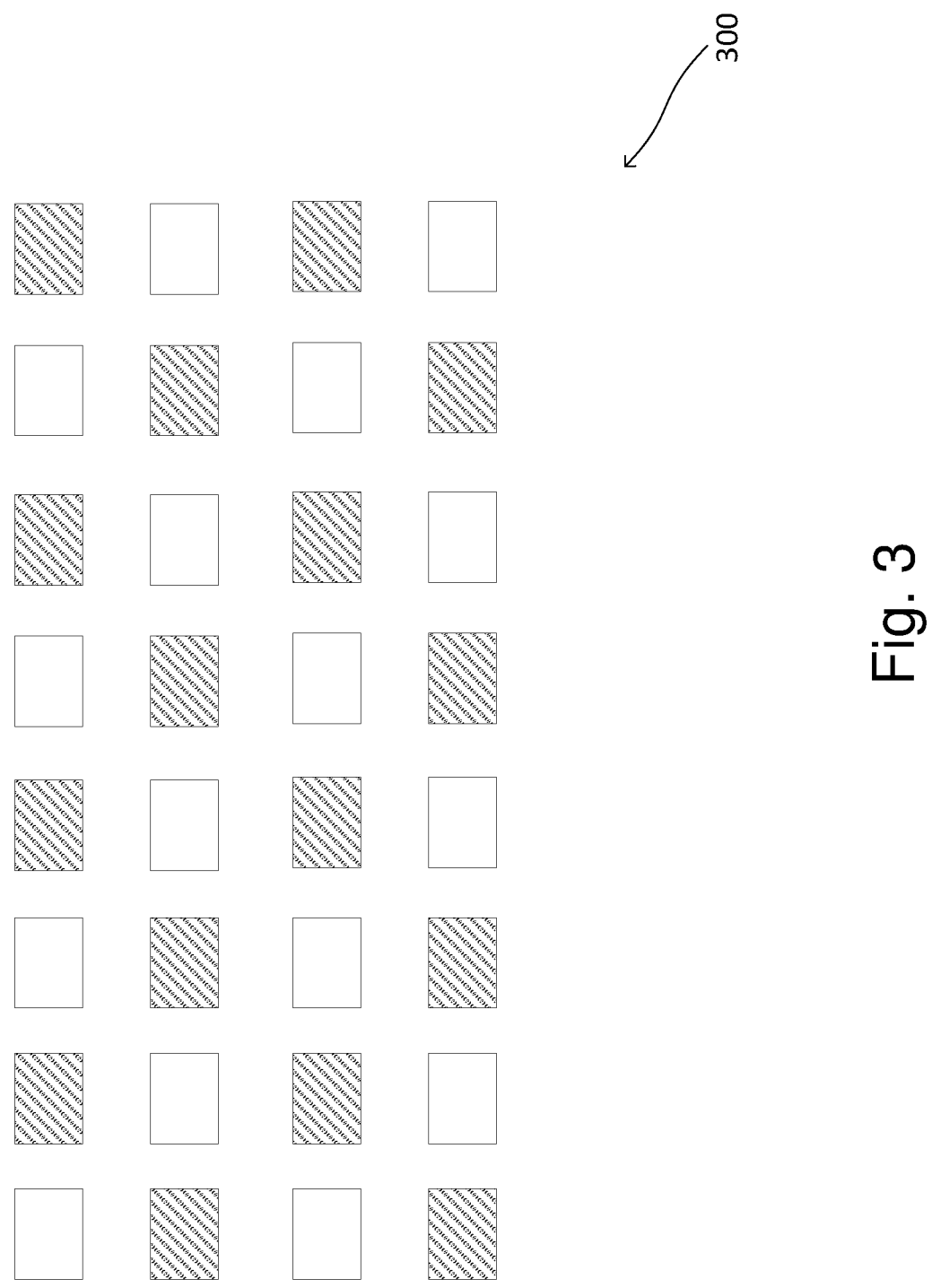
FIG. 3 shows an example spatial arrangement of power sources coupled to power devices operated in different power modes.

Reference is now made to FIG. 3, which illustrates a spatial arrangement of power sources coupled to power devices operated in maximum output power mode and power curtailing mode that may increase accuracy of reserve power estimation. A first group of power sources, represented by rectangles having a diagonal-line pattern fill, may be coupled to power devices configured to operate in a maximum-output-power mode. A second group of power sources, represented by rectangles having a solid white fill, may be coupled to power devices configured to operate in a curtailed-output-power mode. In this particular example, the first group and second group of power sources are highly spatially intertwined (e.g., exposed to the same environmental condition, such as the same insolation, temperature), forming a pattern (for example, resembling that of chess board). This intertwining may improve the accuracy of reserve-power estimation, since maximum power references obtained from the power devices coupled to the first group of power sources indicate potential power production across a large portion of the power system.

Figure 4:
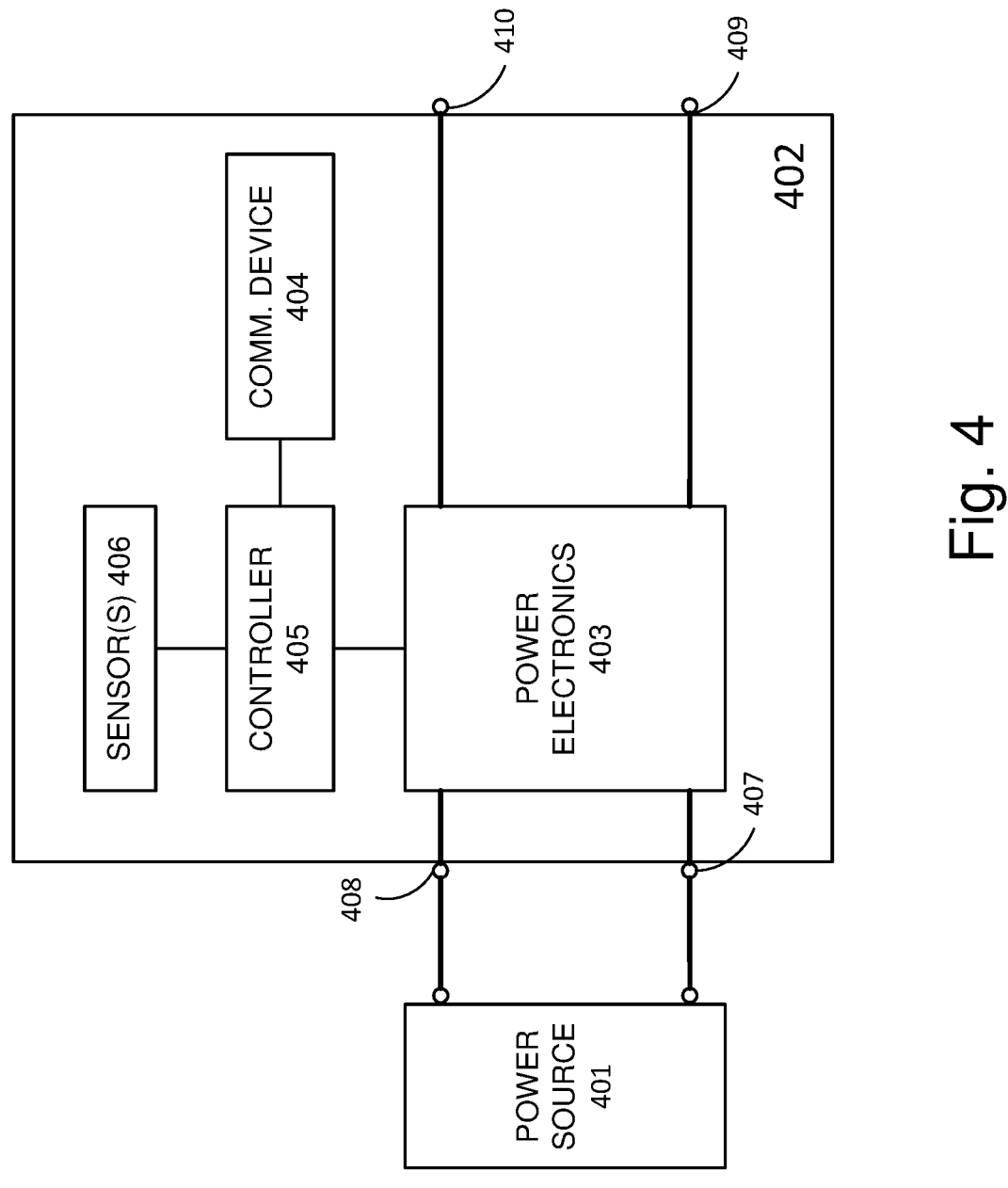
FIG. 4 shows hardware elements of an example power device.

Reference is now made to FIG. 4, which illustrates a power device 402 in accordance with the disclosure herein. Power device 402 may be similar to, the same as and/or used as power devices 102/102M, 103/103M, 202/202C, 203, DC/DC converters 218A/B, and/or inverters 240 in accordance with the disclosure herein. Power device 402 may include input terminals 407 and 408 which are configured to be coupled to a power source 401, which may be similar to or the same as power sources 101 (or a plurality of serially or parallel connected power sources 101). Power device 402 may include output terminals 409 and 410 which are configured to be coupled to another power device (e.g., if power device 402 includes a DC/DC converter, the output terminals may be coupled to another DC/DC converter or a DC/AC converter, and if power device 402 includes a DC/AC converter the output terminals may, in some cases, be coupled to another DC/AC converter), and/or to a combiner box or power grid connection interface (e.g. if power device 402 comprises a DC/AC converter). In some case (e.g., if power device 402 includes a 3-phase DC/AC converter) power device 402 may feature three or more output terminals.

Power device 402 may include power electronics 403 coupled between the pair of input terminals 407 and 408. Power electronics 403 may include, as disclosed previously herein, a direct-current to direct-current (DC/DC) converter configured to draw input power from power source 401 according to at least one of a maximum power point tracking (MPPT) mode of operation and a reduced power point mode of operation, and to provide output power at the output terminals that is substantially equal to the input power (minus unavoidable efficiency losses). The output power may be substantially equal to the input power to the power device multiplied by an efficiency conversion factor of the power device. Additionally or alternatively, power electronics 403 may include a direct-current to alternating-current (DC/AC) converter configured to convert an input DC voltage to an output AC voltage. In some cases, power electronics 403 does not provide conversion circuitry, but may provide one or more power switches configured to selectively connect input terminals 407 and 408 of the power device to the output terminal 409 and 410 of the power device, and/or may provide one or more power switches configured to selectively partially or completely disconnect power source 401 from output terminals 409 and 410 the input to power device 102, and/or may provide one or more power switches configured to selectively, partially, or completely bypass the input terminals 407 and 408 or output terminals 409 and 410 of power device 402.

Controller 405 may be configured to control power electronics 403. Controller 405 may include one or more analog or digital control circuits, microcontrollers, digital signal processors, field programmable gate arrays, or other suitable control devices. Communication device 404 (e.g., including a modem, data converters, modulators, transceivers, and/or antennas) may be coupled to controller 405 and may be configured to communicate with other power devices 402 and/or higher or lower-level communication modules via wired or wireless communications. Sensors 406 may be disposed and configured to sense one or more parameters (e.g. voltage, current, power, frequency, solar irradiance, wind speed, temperature and the like) relevant to power processed by power device 402 and may provide the measurements to controller 405. Controller 405 may provide the measurements to communication device 404 for forwarding to other communication devices and/or controllers.

Figure 5:
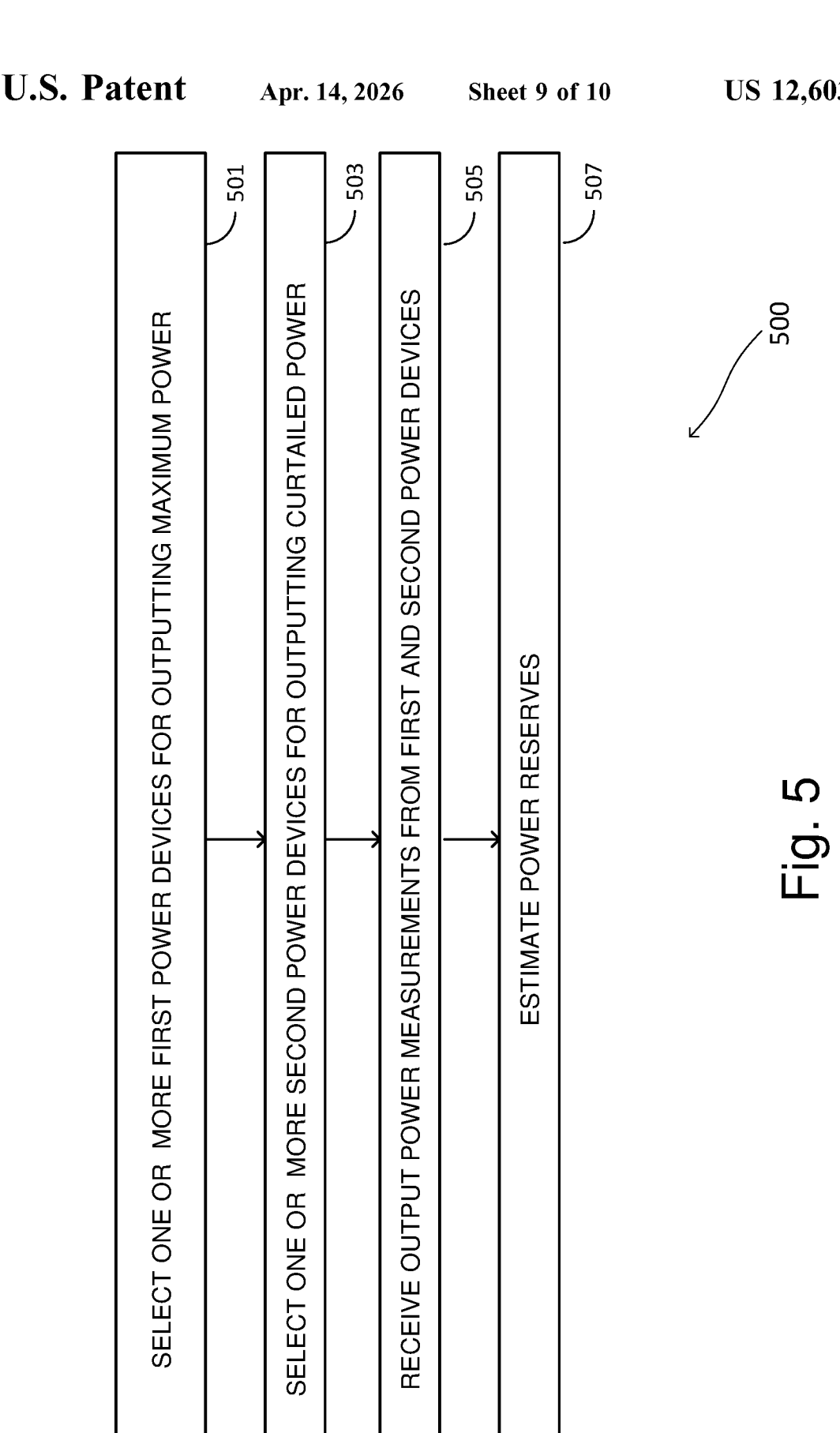
FIGS. 5 and 6 show example methods for operating a power system.

Reference is now made to FIG. 5, which illustrates an example method 500 for operating a power system (e.g. 100, 150, 200, 220, 230, and 260) in accordance with the disclosure herein. Method 500 may be carried out by a controller of a system management device (e.g. 105, 205) disclosed in accordance with the disclosure herein, or a local controller (e.g., controller 225 of FIG. 2B). At step 501, the controller selects one or more first power devices for outputting maximum power. At step 503, the controller selects one or more second power devices for outputting curtailed power.

As mentioned with respect to FIG. 3, in some cases, the selection of the one or more first power devices for outputting maximum power of step 501 and the one or more second power devices for outputting curtailed power of step 503 may be based on an optimization of spatial distribution of the power devices. The spatial distribution of power devices may be different and/or may change over time (e.g., SMD may signal power devices to shift between maximum output power mode and output power curtailment mode). In other the cases, the selection and the number of selected power devices may change due to the determined (e.g., predetermined) spatial resolution.

The selection of the one or more first power devices may be determined based on a predetermined (e.g. pseudo-random) pattern or entirely randomly. In some cases, the selection may be determined in a cyclic or a varying formation between the power devices in the system (e.g., to reduce stress of a specific power device, to increase level of granularity, etc.). In another case, the selection of the first power devices for outputting maximum power may be done, as also explained with reference to FIG. 6, based on historical power production data. For example, the controller may select, based on the historical power production data, first power devices whose power production has high correlation with total power production of the system.

In other cases, as mentioned with respect to FIGS. 1A-1B and 2A-2D, the selection of the one or more first power devices for outputting maximum power of step 501 and the one or more second power devices for outputting curtailed power of step 503 may be based on historical data related to maximum-output-power-mode production of the power devices. For example, the controller may select the one or more first power devices for outputting maximum power if its MPP was the most similar to the average power at the power system (e.g., power system 100, power system 200) throughout specific time interval, specific time of the year, etc.

At step 505, the controller receives output power measurements (either by measuring directly, or via a communication comprising the measurements) from first and second power devices. At step 507, based on the output power measurements, the controller estimates curtailed power (i.e. power reserves). The curtailed power may be transmitted to a central station or other device and displayed on a display.

The controller may estimate the power reserves (e.g., the curtailed power) according to the following steps. The controller may determine, based on the output power measurements of the first power devices, a measured maximum power of the first power devices. The controller may calculate, based on the measured maximum power, a total potential output power if each power device of the second power devices would output a corresponding measured maximum power as the measured maximum power of each power device of the first power devices. For example, an average or median of the measured maximum power per device can be used. The controller may calculate, based on the total potential output power and the output power measurements from the first and the second power devices, the estimate value for reserve power of the plurality of power devices.

In some embodiments, a selection of the first power devices for outputting maximum power is based on historical power production data. For example, this may facilitate that a more accurate selection can be made, e.g. compared to assuming a rated power. In one embodiment, the controller selects, based on the historical power production data, as the first power devices, a subset of power devices from the plurality of power devices whose power production matches the total power production of the system, e.g. matching the power production within a predetermined threshold and/or having the overall best matching power production (compared to other possible selections). For example, this may facilitate efficient utilization of the power devices. In other or further embodiments, some or all of the non-selected power devices in the plurality of power devices form the second power devices whose power production may be curtailed. For example, this may facilitate a maximum number of second power devices can be kept in reserve and/or spared. In other or further embodiments, a measurement of power production for one or more power devices is performed and compared to historical power production data for those one or more power devices. For example, this may help to determine possible changes in power production data and/or reliability of the historical power production data. In one embodiment, selecting one or more power devices for operation in a maximum output power mode is based on minimizing (or reducing) a difference between the historical power production data and the measured power production of those devices. For example, this may help to improve accuracy in providing a desired power output. In another or further embodiment, selecting one or more power devices for operation in a curtailed output power mode is based on minimizing (or reducing) a difference between the historical power production data and the measured power production of those devices. For example, this may help to improve an estimate of power kept in reserve.

Figure 6:
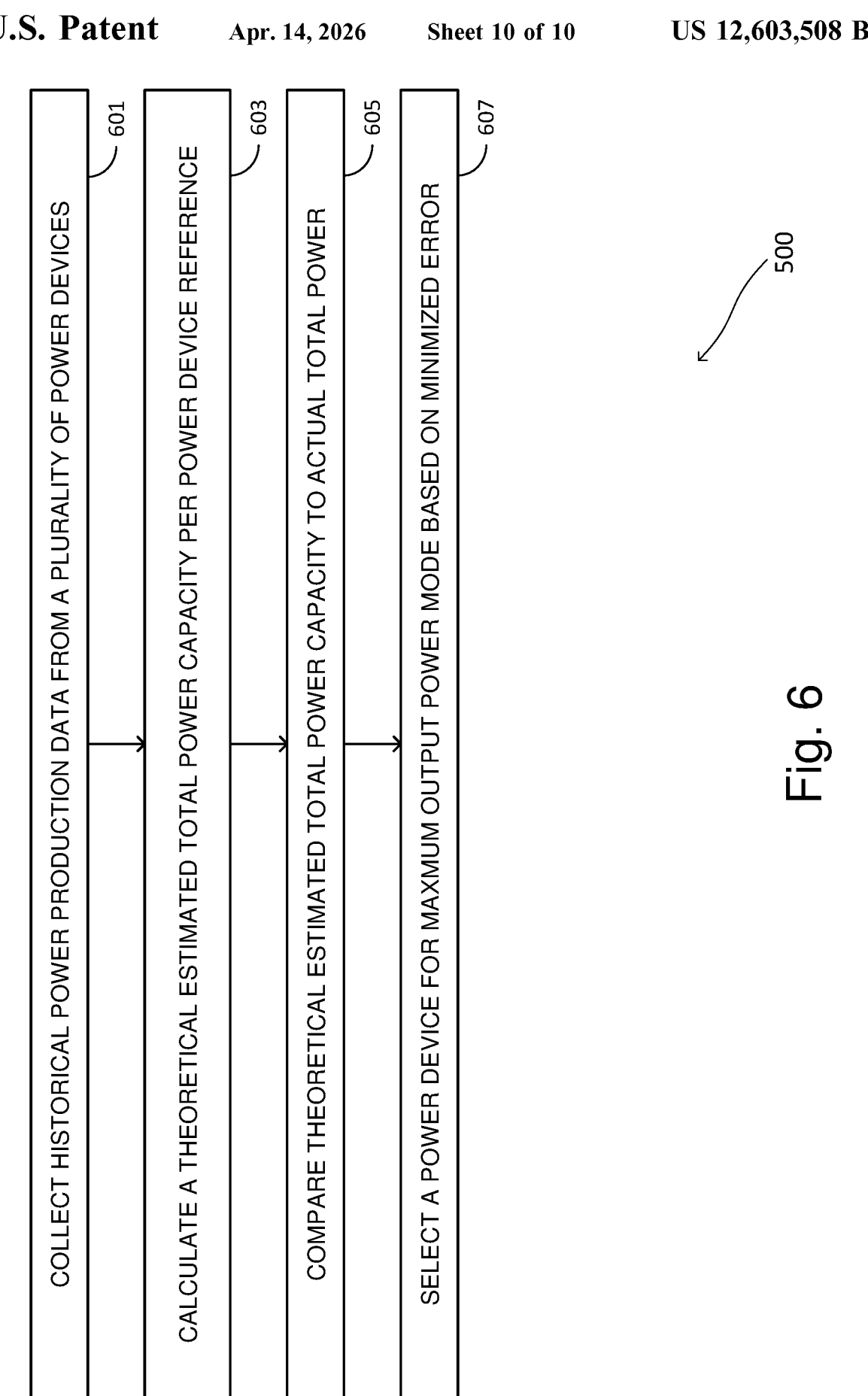

Reference is now made to FIG. 6, which illustrates an example method 600 for implementing step 501 of method 500. Method 600 may be carried out by the same controller carrying out method 500. Method 600 may be an example for a selection of the first power devices for outputting maximum power, based on historical power production data. For example, the controller may select, based on the historical power production data, first power devices whose power production matches and/or has high correlation with the total power production of the system. At step 601, the controller draws upon historical power production data of a plurality of power devices that are candidates for selection for operation in maximum output power mode. The candidates for selection may be selected based on various methods described referring to FIG. 5. At step 603, the controller calculates an estimate of what system output power (e.g., theoretical estimated total power capacity) would be achieved based on the historical data related and/or correlated to each candidate power devices (e.g., power device reference). At step 605, the controller may compare the theoretical estimated power capacity (e.g., the estimated system output power indicated by the historical data) to the actual total power. Based on the comparison, the controller may calculate the resultant estimation error of each candidate power device relied upon for said estimate. At step 607, the controller selects one or more power devices for operation in maximum output power mode based on minimizing (or reducing) an error calculated at step 605.

According to aspects of the disclosure, a power system is provided. The power system comprising:

a plurality of power sources, a plurality of power devices, each configured to draw power from one or more power sources from the plurality of power sources and provide an output power to an electrical grid or a load, wherein a first power device of the plurality of power devices is configured to provide a first output power substantially corresponding to a maximum output power of the first power device, wherein a second power device of the plurality of power devices is configured to provide a second output power that is substantially less than a maximum output power capable of the second power device.

In an embodiment, the power system further comprises a control module configured to signal the second power device to increase the second output power in response to a dispatch need.

In an embodiment, the first and second power devices comprise power switches.

In an embodiment, the first and second power devices comprise power converters.

In an embodiment, the first and second power devices comprise direct current to direct current (DC/DC) power converters.

In an embodiment, the first and second power devices comprise direct current to alternating current (DC/AC) power converters.

In an embodiment, the first and second power devices comprise power converters configured to selectively activate a maximum power point tracking mode of operation.

In an embodiment, the first and second power devices comprise power converters configured to selectively activate a power derating mode of operation.

In an embodiment, the first and second power devices comprise microinverters.

In an embodiment, the first and second power devices comprise microinverters.

In an embodiment, the first and second power devices comprise microinverters.

In an embodiment, the outputs of the first and second power devices are connected in series.

In an embodiment, the outputs of the first and second power devices are connected in parallel.

In an embodiment, the first and second power devices comprise communication devices, and are configured to, via the communication devices, provide input or output power values to the control module.

In an embodiment, the first and second power devices comprise sensors and are configured to obtain the input or output power values based on measurements obtained by the sensors In an embodiment, the second output power is substantially equal to power input to the second power device multiplied by an efficiency conversion factor of the second power device.

In an embodiment, the maximum output power of the second power device is substantially equal to a maximum power available at an input of the second power device multiplied by an efficiency conversion factor of the second power device.

In an embodiment, the second output power is less than %95 of the maximum output power of the second power device.

In an embodiment, the second output power is less than %90 of the maximum output power of the second power device.

In an embodiment, the second output power is less than %50 of the maximum output power of the second power device.

In an embodiment, the second output power is less than %1 of the maximum output power of the second power device.

In an embodiment, the power system further comprises an energy storage device, wherein the second output power is substantially equal to power input to the second power device minus power transferred to the energy storage device.

In an embodiment, the power system further comprises a plurality of first power devices each respectively coupled to a different power source of the plurality of power sources, and a plurality of second power devices each respectively coupled to a different power source of the plurality of power sources, wherein all of the plurality of first power devices are configured to output substantially maximum output power and all of the plurality of second power devices are configured to output substantially less than maximum output power.

In an embodiment, the power sources coupled to the plurality of second power devices are spatially distributed across the power system.

In an embodiment, the plurality of first power devices are configured to be operable as second power devices to output substantially less than maximum output power, and the plurality of second power devices are configured to be operable as first power devices to output substantially maximum output power.

In an embodiment, the control module is configured to calculate an estimate of a maximum output power of the power system based on the first output power.

In an embodiment, the control module is configured to calculate a reserve power dispatch capacity based on the estimate of a maximum output power of the power system.

According to aspects of the disclosure, a method is provided. The method comprises:

controlling one or more first power devices of a plurality of power devices, connected respectively to a plurality of power sources, to output maximum power;

controlling one or more second power devices of the plurality of power devices to output curtailed power;

receiving, by a controller, output power measurements from the first and the second power devices; and based on the output power measurements, estimating reserve power of plurality of power devices.

In an embodiment of the method, the controlling of the one or more power devices comprises:

collecting historical power production data from one or more reference power devices of a plurality of power devices connected respectively to a plurality of power sources;

calculating a theoretical estimated total power capacity per the one or more reference power device;

measuring an actual total power output of the plurality of power devices;

comparing the theoretical estimated total power capacity to the actual total power; and controlling one or more first power devices of the plurality of power devices to output a maximum power based on the comparing of the theoretical estimated total power capacity to the actual total power.

In an embodiment of the method, the comparing includes: calculating, based on the actual total power, what a resultant estimation error would be if each power device were relied upon for said theoretical estimated total power capacity, wherein the controlling is based on the resultant estimation error.

Here follows a list of clauses highlight various aspects of the disclosure.

Clause 1. A power system comprising:

a plurality of power sources, a plurality of power devices, each configured to draw power from one or more power sources from the plurality of power sources and provide an output power to an electrical grid or a load, wherein a first power device of the plurality of power devices is configured to provide a first output power substantially corresponding to a maximum output power of the first power device, wherein a second power device of the plurality of power devices is configured to provide a second output power that is substantially less than a maximum available output power of the second power device.

Clause 2. The power system of clause 1, further comprising a system management device configured to signal the second power device to increase the second output power in response to a dispatch need.

Clause 3. The power system of clause 1 or 2, further comprising a system management device (e.g. the system management device of clause 2, or another device) configured to signal the first and second power devices to selectively change a mode of operation between a curtailment mode of operation and an MPPT mode of operation.

Clause 4. The power system of any of the preceding clauses, wherein the first and second power devices comprise power switches.

Clause 5. The power system of any of the preceding clauses, wherein the first and second power devices comprise power converters.

Clause 6. The power system of any of the preceding clauses, wherein the first and second power devices comprise direct current to direct current (DC/DC) power converters.

Clause 7. The power system of any of the preceding clauses, wherein the first and second power devices comprise direct current to alternating current (DC/AC) power converters.

Clause 8. The power system of any of the preceding clauses, wherein the first and second power devices comprise power converters configured to selectively activate a maximum power point tracking mode of operation.

Clause 9. The power system of any of the preceding clauses, wherein the first and second power devices comprise power converters configured to selectively activate a curtailment mode of operation.

Clause 10. The power system of any of the preceding clauses, wherein the first and second power devices comprise microinverters.

Clause 11. The power system of any of the preceding clauses, wherein outputs of the first and second power devices are connected in series.

Clause 12. The power system of any of the preceding clauses, wherein outputs of the first and second power devices are connected in parallel.

Clause 13. The power system of any of the preceding clauses, wherein the first and second power devices comprise communication devices, and are configured to, via the communication devices, provide input or output power values to a system management device (e.g. the system management device of any preceding clause, or another device).

Clause 14. The power system of the preceding clause, wherein the first and second power devices comprise sensors and are configured to obtain the input or output power values based on measurements obtained by the sensors.

Clause 15. The power system of any of the preceding clauses, wherein the first output power is substantially equal to input power to the first power device multiplied by an efficiency conversion factor of the first power device.

Clause 16. The power system of any of the preceding clauses, wherein the maximum output power of the second power device is substantially equal to a maximum power available at an input of the second power device multiplied by an efficiency conversion factor of the second power device.

Clause 17. The power system of any of the preceding clauses, wherein the second output power is less than 95% of the maximum output power of the second power device.

Clause 18. The power system of any of the preceding clauses, wherein the second output power is less than 90% of the maximum output power of the second power device.

Clause 19. The power system of any of the preceding clauses, wherein the second output power is less than 50% of the maximum output power of the second power device.

Clause 20. The power system of any of the preceding clauses, wherein the second output power is less than 1% of the maximum output power of the second power device.

Clause 21. The power system of any of the preceding clauses, further comprising an energy storage device, wherein the second output power is substantially equal to input power to the second power device minus power transferred to the energy storage device.

Clause 22. The power system of any of clauses 1-14, further comprising an energy storage device, wherein a system management device (e.g. the system management device of any preceding clause, or another device) is configured to receive power from the first and second power devices, and output power of the system management device is substantially equal to input power to the second power device minus power transferred to the energy storage device.

Clause 23. The power system of any of the preceding clauses, further comprising a plurality of first power devices each respectively coupled to a different power source of the plurality of power sources, and a plurality of second power devices each respectively coupled to a different power source of the plurality of power sources, wherein all of the plurality of first power devices are configured to output substantially maximum output power and all of the plurality of second power devices are configured to output substantially less than maximum output power.

Clause 24. The power system of the preceding clause, wherein the power sources coupled to the plurality of second power devices are spatially distributed across the power system.

Clause 25. The power system of any of the two preceding clauses, wherein the plurality of first power devices are configured to be operable as second power devices to output substantially less than maximum output power, and the plurality of second power devices are configured to be operable as first power devices to output substantially maximum output power.

Clause 26. The power system of any of the preceding clauses, wherein a system management device (e.g. the system management device of any preceding clause, or another device) is configured to calculate an estimate of a maximum available output power of the power system based on the first output power.

Clause 27. The power system of the preceding clause, wherein a system management device (e.g. the system management device of any preceding clause, or another device) is configured to calculate a reserve power dispatch capacity based on the estimate of a maximum available output power of the power system.

Clause 28. The power system of any of the preceding clauses, wherein a system management device (e.g. the system management device of any preceding clause, or another device) is configured to select the first power device to operate at an MPPT mode of operation, based on spatial distribution of power devices in the power system.

Clause 29. The power system of any of clauses 2-26, wherein a system management device (e.g. the system management device of any preceding clause, or another device) is configured to select the first power device to operate at an MPPT mode of operation, based on historical data related to maximum-output-power-mode production of the first power device.

Clause 30. The power system of any of the preceding clauses-, wherein a system management device (e.g. the system management device of any preceding clause, or another device) is configured to select the first power device to operate at an MPPT mode of operation, based on historical data related to power production of power devices in the power system.

Clause 31. A method comprising:
controlling one or more first power devices of a plurality of power devices, connected respectively to a plurality of power sources, to output maximum power;

controlling one or more second power devices of the plurality of power devices to output curtailed power;

receiving, by a controller, output power measurements from the first and the second power devices; and based on the output power measurements, estimating reserve power of plurality of power devices.

Clause 32. The method of clause 30, wherein the controlling of the one or more power devices comprises:

collecting historical power production data from one or more reference power devices of a plurality of power devices connected respectively to a plurality of power sources;

calculating a theoretical estimated total power capacity per the one or more reference power device;

measuring an actual total power output of the plurality of power devices;

comparing the theoretical estimated total power capacity to the actual total power; and controlling one or more first power devices of the plurality of power devices to output a maximum power based on the comparing of the theoretical estimated total power capacity to the actual total power.

Clause 33. The method of clause 31, wherein the comparing includes:

calculating, based on the actual total power, what a resultant estimation error would be if each power device were relied upon for said theoretical estimated total power capacity, wherein the controlling is based on the resultant estimation error.

Clause 34. The method of any of clauses 30-32, further comprising, retaining the reserve power for dispatch.

Clause 35. The method of clause 33, further comprising, diverting, based on the dispatch, the reserve power to inverter output receiving power from the one or more first and second power devices.

Clause 36. The method of any of clauses 30-32, further comprising, storing the reserve power in a power storage; transferring stored power for dispatch.

Clause 37. The method of any of clauses 30-35, further comprising, signaling, by a system management device, the one or more first power devices to operate in an MPPT mode of operation and the one or more second power devices to operate in between a curtailment mode of operation.

Clause 38. The method of any of clauses 30-35, further comprising, signaling, by a system management device, the one or more first power devices and the one or more second power devices to selectively change a mode of operation between a curtailment mode of operation and an MPPT mode of operation.

Clause 39. The method of any of clauses 30-35, further comprising, selecting, by a system management device, the one or more first power devices and the one or more second power devices, based on spatial distribution of power devices in a power system comprising the one or more first power devices and the one or more second power devices.

Clause 40. The method of any of clauses 30-35, further comprising, selecting, by a system management device, the one or more first power devices, based on historical data related to maximum-output-power-mode production of the one or more first power devices.

Clause 41. The method of any of clauses 30-35, further comprising, selecting, by a system management device, the one or more first power devices, based on historical data related to power production of power devices in a power system comprising the one or more first power devices and the one or more second power devices.

Clause 42. A method, performed alone or in combination with the method of any of the preceding clauses, the method comprising:

selecting, by a controller, one or more first power devices to output a maximum output power of the one or more first power devices, and one or more second power devices to provide a second output power that is substantially less than a maximum available output power of the one or more second power devices, based on:

calculating, a theoretical estimated total power capacity per power device reference;

calculating, based on historical data related to the one or more first and second power devices and a power device reference, an estimation of a system output power;

determining, based on measurements, actual system power;

calculating, based on the actual system power and the estimation, a resultant estimation error;

selecting, one or more power devices for operation in maximum output power mode based on minimizing the resultant estimation error.

Clause 43. A method, performed alone or in combination with the method of any of the preceding clauses, the method comprising:

selecting, by a controller, one or more first power devices to output a maximum output power of the one or more first power devices, and one or more second power devices to provide a second output power that is substantially less than a maximum available output power of the one or more second power devices, based on:

calculating, a theoretical estimated total power capacity per power device reference;

calculating, based on historical data related to the one or more first and second power devices and a power device reference, an estimation of a system output power;

determining, based on measurements, actual system power;

calculating, based on the actual system power and the estimation, a resultant estimation error;

selecting, based on a minimized estimation error, a power device to output a maximum output power.

Clause 44. A (non-transitory) computer-readable medium storing instructions that, when executed by one or more processors, cause a controller, device, and/or system as described herein (e.g. the power system according to any of clauses 1-30) to perform the method according to any of the embodiments described herein (e.g. the method of any of clauses 31-43).

Clause 45. A power system may comprise a plurality of power sources, each connected to a corresponding power device. The power devices may be connected in series or in parallel. Each power device may comprise input terminals connected to the corresponding power source, output terminals, and a power circuit (e.g., a power converter) that may be configured to convert input power from the corresponding power source to output power. The power regulator may further comprise a regulator communications module that may be configured to receive a power regulation indication relating to regulating an operational characteristic of the power regulator. The regulator controller may be configured to instruct the power converter to increase or decrease the regulator operational characteristic based on the power regulation indication, and based on power production characteristics of the power regulator. The change the operational characteristics may be used to estimate reserved power of the system.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting. The claims follow hereafter.

The invention claimed is:

1. A method comprising:
selecting one or more first power devices of a plurality of power devices connected respectively to a plurality of power sources, and one or more second power devices of the plurality of power devices, based on spatial distribution of the plurality of power devices in a power system;
controlling the one or more first power devices of the plurality of power devices to output a maximum power;
controlling the one or more second power devices of the plurality of power devices to output curtailed power;
receiving, by a controller, output power measurements from the one or more first power devices and the one or more second power devices; and
based on the output power measurements, determining an estimate value for reserve power of the plurality of power devices.

2. The method of claim 1, wherein the controlling of the one or more first power devices comprises:
collecting historical power production data of one or more reference power devices of the plurality of power devices;
calculating a theoretical estimated total power capacity of the plurality of power devices based on the collected historical power production data;
measuring an actual total power output of the plurality of power devices;
comparing the theoretical estimated total power capacity to the actual total power output; and
selecting the one or more first power devices of the plurality of power devices to output the maximum power based on the comparing of the theoretical estimated total power capacity to the actual total power output.

3. The method of claim 2, further comprising:
calculating, based on the comparing of the theoretical estimated total power capacity to the actual total power output, what a resultant estimation error would be for each power device of the one or more reference power devices; and
selecting, based on a minimized resultant estimation error, a selected power device of the one or more reference power devices to output a-maximum power.

4. The method of claim 1, further comprising, based on the estimate value for the reserve power of the plurality of power devices, retaining the reserve power for dispatch.

5. The method of claim 1, wherein the determination of the estimate value for the reserve power of the plurality of power devices comprises:
determining, based on the output power measurements of the one or more first power devices, a measured maximum power of the one or more first power devices;

calculating, based on the measured maximum power, a potential maximum power of the one or more second power devices, wherein the potential maximum power corresponds to the measured maximum power; and
calculating, based on the potential maximum power and the output power measurements from the one or more first power devices and the one or more second power devices, the estimate value for the reserve power of the plurality of power devices.

6. The method of claim 1, further comprising:
storing the reserve power in a power storage; and
transferring stored power for dispatch.

7. The method of claim 1, further comprising, signaling, by a system management device, the one or more first power devices and the one or more second power devices to selectively change a mode of operation between a curtailment mode of operation and a maximum power point tracking mode of operation.

8. The method of claim 1, wherein the selecting of the one or more first power devices and the one or more second power devices is based on the one or more first power devices and the one or more second power devices being connected, respectively, to power sources exposed to substantially same irradiance conditions.

9. The method of claim 1, wherein the selecting of the one or more first power devices and the one or more second power devices is based on the one or more first power devices and the one or more second power devices being connected, respectively, to power sources exhibiting correlative power production.

10. The method of claim 1, further comprising, selecting, by a system management device, the one or more first power devices, based on historical data related to power production of the power system.

11. A power system comprising:
a plurality of power sources;
a plurality of power devices, each configured to draw power from one or more power sources of the plurality of power sources and provide an output power to an electrical grid or a load; and
a controller configured to:
select a first power device of the plurality of power devices and a second power device of the plurality of power devices, based on spatial distribution of the plurality of power devices;
control the first power device of the plurality of power devices to provide a first output power substantially corresponding to a maximum output power of the first power device; and
control the second power device of the plurality of power devices to provide a second output power that is less than a maximum available output power of the second power device;
receive output power measurements from the first and the second power devices; and
based on the output power measurements, determine an estimate value for reserve power of the plurality of power devices.

12. The power system of claim 11, further comprising a system management device configured to signal the second power device to increase the second output power in response to a dispatch need.

13. The power system of claim 11, further comprising a system management device, wherein the system management device is configured to signal the first and the second power devices to selectively change a mode of operation between a curtailment mode of operation and a maximum power point tracking, MPPT; mode of operation.

14. The power system of claim 11, wherein the first and the second power devices comprise power converters configured to selectively activate a curtailment mode of operation.

15. The power system of claim 11, wherein the second output power is substantially equal to input power to the second power device minus power transferred to an energy storage device.

16. The power system of claim 11, further comprising a system management device configured to receive power from the first and the second power devices, and output power substantially equal to input power to the second power device minus power transferred to an energy storage device.

17. The power system of claim 11, further comprising:

a plurality of first power devices each respectively coupled to a different power source of the plurality of power sources; and a plurality of second power devices each respectively coupled to a different power source of the plurality of power sources, wherein all of the plurality of first power devices are configured to output substantially maximum output power and all of the plurality of second power devices are configured to output substantially less than maximum output power.

18. The power system of claim 11, further comprising a system management device configured to calculate an estimate of a maximum available output power of the power system based on the first output power.

19. The power system of claim 18, wherein the system management device is configured to calculate a reserve power dispatch capacity based on the estimate of the maximum available output power of the power system.

20. The power system of claim 11, further comprising a system management device configured to select the first power device to operate at a maximum power point tracking mode of operation, based on historical data related to a maximum-output-power-mode production of the first power device.

* * * * *